Frederick T. Shaver
INVENTOR.

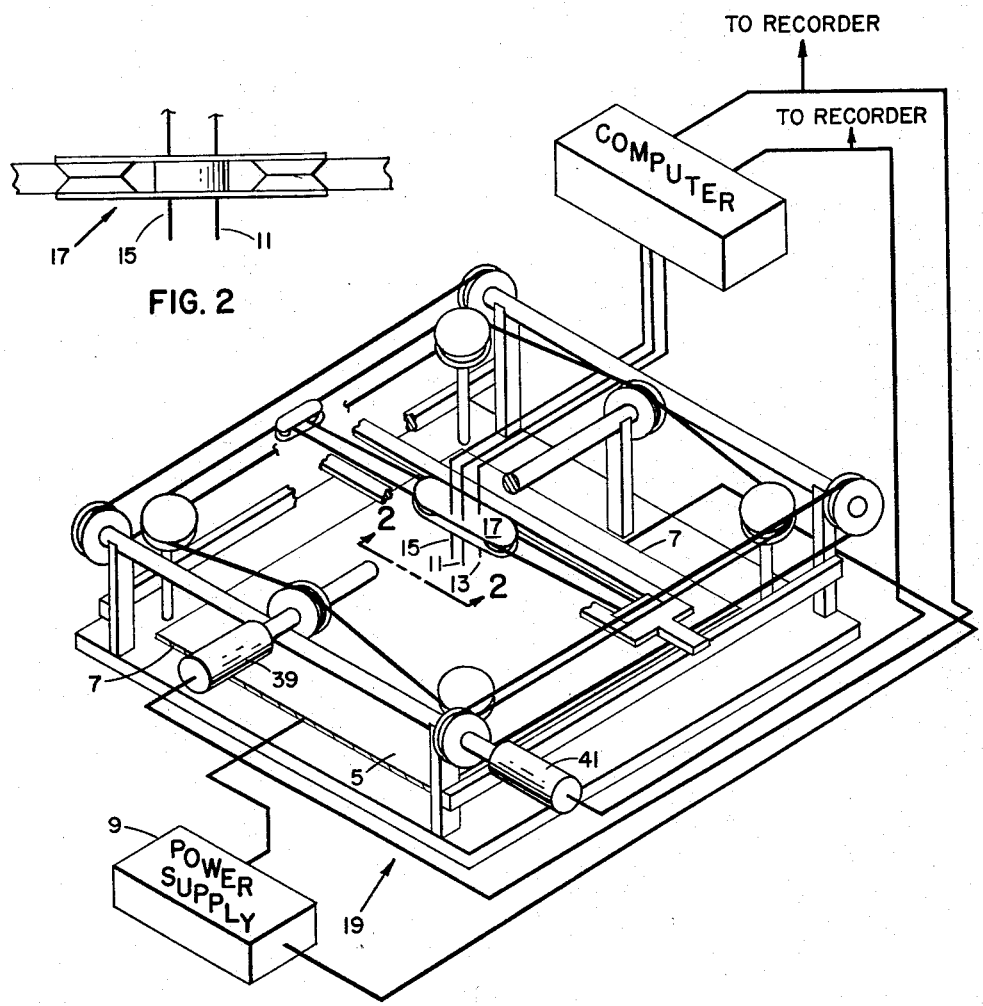

United States Patent Office 3,283,134
Patented Nov. 1, 1966

3,283,134
PARTICLE TRAJECTORY PLOTTER
Frederick T. Shaver, Huntsville, Ala., assignor to the United States of America as represented by the Secretary of the Army
Filed Jan. 28, 1963, Ser. No. 254,524
1 Claim. (Cl. 235—184)

The invention described herein may be manufactured and used by or for the Government for governmental purposes without the payment of any royalty thereon.

This invention relates generally to a particle trajectory plotter and more particularly to an electrically charged particle trajectory plotter.

In the design of vacuum tubes, ion engines and similarly related designs which operate primarily on the movement of charged particles in electrostatic fields, it is often necessary to determine the trajectory of an electrically charged particle moving under the influence of an electrostatic field. The present invention fulfills this need and comprises a device to plot the trajectory of a charged particle by simulating the particle, its mass, initial velocity, and initial entry point into the electrostatic field by an analog computer. The electrostatic field is simulated by a conducting sheet model having electrodes and a voltage supply for applying a potential across the conducting sheet model. Voltage gradients on the charged particle, as it moves through the field, are sensed by pairs of closely spaced probes parallel to the X and Y axis respectively. These voltage gradients are fed into the computer and the output voltages, which are proportional to X and Y, are fed into an X-Y plotter to position a pen carriage which holds the probes on the conducting sheet model. The voltages proportional to X and Y can also be fed into another plotter to record the trajectory of the particle as it is computed by the computer. The pen carriage mentioned above holds three probes, a first probe 11 represents the point on the conducting sheet of the charged particle, a second probe 13 is positioned to sense voltage gradients in the X direction from the first probe and a third probe 15 positioned to sense voltage gradients in the Y direction from the first probe, whereby, the computer calculates the trajectory of a charged particle.

It is therefore an object of this invention to provide a device for calculating the trajectory of a charged particle.

A further object of this invention is to provide a device for plotting the trajectory of a charged particle without the physical presence of the particle.

Another object of this invention is to provide a device for plotting the path of a charged particle for any geometric field configuration which may be represented by painting electrodes on a resistive paper sheet model.

According to the present invention, the foregoing and other objects may be more specifically pointed out by reviewing the general equations describing the motion of a particle of mass ($m$) with a charge ($q$) in an electrostatic field where the electrostatic potential ($v$) is a function of X and Y as follows:

(1) $$E_x = \frac{\partial v}{\partial x} = -\frac{m}{q}\frac{\partial^2 x}{\partial t^2}$$

(2) $$E_y = \frac{\partial v}{\partial y} = -\frac{m}{q}\frac{\partial^2 y}{\partial t^2}$$

Rearranging as follows:

(1) $$\frac{\partial^2 x}{\partial t^2} = -\frac{q}{m}E_x$$

(2) $$\frac{\partial^2 y}{\partial t^2} = -\frac{q}{m}E_y$$

Thus it can be seen that by sensing the voltages $E_x$ and $E_y$ and multiplying these by the proper constants and integrating these voltages twice the X and Y components can be obtained as the output of the computer to position the pen carriage.

The above and other features of the invention will be described in the following detailed description taken in conjunction with the drawings in which:

FIGURE 1 is a pictorial view, partly broken away, showing an X-Y plotter arrangement;

FIGURE 2 is an elevational view of the pen carriage; and

Figure 3:
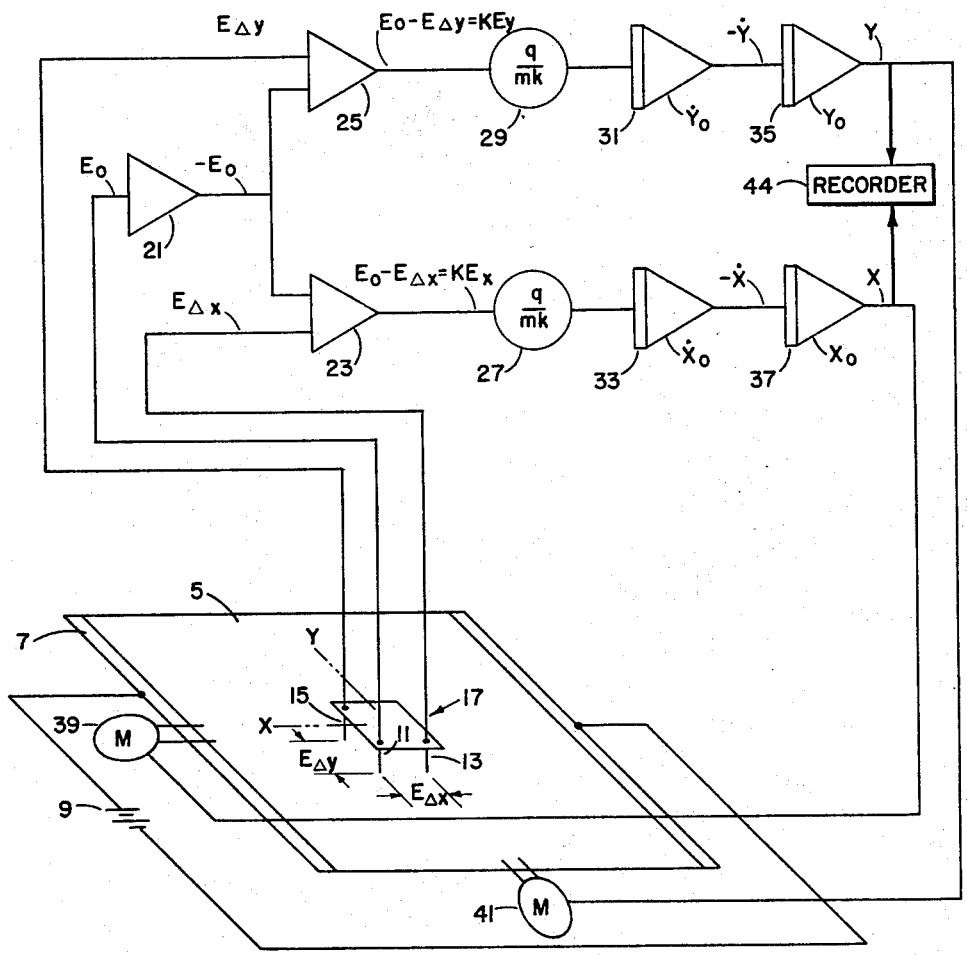
FIGURE 3 is a block diagram of a particle trajectory plotter according to the present invention.

The electrostatic field ($v$) is simulated by a conducting sheet model 5, which is a resistive paper having electrodes 7 painted on the paper in a predetermined geometric configuration such as the ones painted on the edge of two opposite sides as shown in FIGURE 3. A potential is placed across the sheet 5 by means of the power supply 9 connected to electrodes 7. In order to sense potential gradients $E_{\Delta x}$ and $E_{\Delta y}$, pairs of closely spaced probes 11, 13, and 15 are positioned parallel to the X and Y axis respectively and are held in position by means of pen carriage 17 which is an integral part of the X-Y plotter 19 shown in FIGURE 1. Probe 11 which senses the reference voltage $E_0$ is connected to an inverting amplifier 21 which has as its output $-E_0$. Probe 13 which senses the voltage gradient in the X direction is connected to summing amplifier 23 along with the output ($-E_0$) of inverting amplifier 21 which yields as its output $E_0 - E_{\Delta x}$ and simultaneously probe 15 senses the voltage gradient $E_{\Delta y}$ in the Y direction and is connected to summing amplifier 25 along with the output ($-E_0$) of inverting amplifier 21 which yields as its output $E_0 - E_{\Delta y}$. The output of summing amplifier 23 is connected to multiplier 27 and the output of summing amplifier 25 is connected to multiplier 29. Each of the multipliers (27 and 29) have a multiplying constant $q/mk$ where $q$ is the charge of the particle whose trajectory is being plotted, $m$ is the mass of the same particle and $k$ is a predetermined constant for determining the size of plot that is to be made. The output of the multiplier 27 is integrated twice by integrators 33 and 37 connected in series thus giving the output X which is fed to motor 39 to position the pen carriage 17 in the X direction. Simultaneously, the output of multiplier 29 is integrated twice by integrators 31 and 35 in series and the output of integrator 35 is fed into motor 41 for positioning the pen carriage 17 in the Y direction. The simultaneous movement of motors 39 and 41 according to the X and Y output respectively will position the pen carriage along the trajectory of the charged particle being simulated by the computer circuit described. In order to record this trajectory an oscilliscope or another X-Y plotter 44 could be connected to the X and Y output of the computer.

In operation, a resistiive sheet model, representing the geometric configuration of an electric field in which the trajectory of a charged particle is to be studied, is placed in the X-Y plotter 19 as shown in FIGURE 1. A predetermined voltage is placed on sheet 5 by means of power supply 9. The resistive nature of the sheet 5 is such that an electrostatic field is produced in conjunction with the configuration of the sheet. Thus, making it possible to plot the trajectory of a charged particle having a given charge and mass moving under influence of the particular configuration of the electrostatic field produced by the resistive sheet model 5. The point of entry of the particle into the field is represented by reference probe 11, therefore, the pen carriage is adjusted to the predetermined point of entry of the particle. Since it is usually the situation that a particle entering an electric field has an initial velocity, it is provided in integrators 31 and 33 and noted by $\dot{Y}_0$ and $\dot{X}_0$ respectively the means for setting an initial velocity of the charged particle. Also, provided in integrators 35 and 37 is the means for setting the initial orientation of the particle noted by $Y_0$ and $X_0$ respectively which will position reference probe 11 to the point of entry of the particle into the field. Preceding the integrators of both circuits Y and X are multipliers 27 and 29 which have means for setting a constant according to the proportionality of charge of the particle to the mass of the particle and the scale constants. When all of these preliminary adjustments have been made the computer is started and simultaneously an X and Y positioning voltage is fed from the computer to motors 41 and 39 respectively and the pen carriage is moved along the trajectory of the charged particle as the computer continuously computes the incremental voltage gradients sensed by probes 13 and 15 to produce outputs X and Y respectively which continuously repositions the probes. The computation is continued and stopped at the discretion of the operator. Simultaneous to the movement of X-Y plotter 19 a second plotter is connected in the same manner except constructed to record the trajectory of the particle as it is computed.

Obviously many modifications and variations of the present invention are possible in the light of the above teachings. It is therefore to be understood that within the scope of the appended claim the invention may be practiced otherwise than as specifically described.

What is claimed is:

A particle trajectory plotter comprising:

(a) a conductive sheet model made of electrical resistive paper;
(b) said paper having electrodes painted in a predetermined geometric configuration thereon;
(c) a voltage supply electrically connected to said electrodes for applying an electrical potential across said paper;
(d) a pen carriage having first, second and third electrical probes extending downwardly therefrom in a rectangular co-ordinate configuration;
(e) said first probe simulating the point of a charged particle on said paper;
(f) said second probe being placed parallel to the abscissa of said rectangular co-ordinate configuration of said probes and close to said first probe whereby the potential gradient from said first probe to said second probe may be measured,
(g) said third probe being placed parallel to the ordinate of said rectangular co-ordinate configuration and close to said first probe whereby the potential gradient from said first probe to said second probe may be measured;
(h) an electrical inverter electrically connected to said first probe for reversing the polarity of the voltage picked up by said first probe;
(i) first and second electrical summing amplifiers each having first, second and third electrical terminals;
(j) connecting means for electrically connecting said second probe to said first terminal of said first summing amplifier and said second terminal of said first summing amplifier to the output of said inverter;
(k) connecting means for electrically connecting said third probe to said first terminal of said second summing amplifier and said second terminal of said second summing amplifier to the output of said inverter;
(l) first and second constant multipliers;
(m) connecting means for electrically connecting said first multiplier to said third terminal of said first summing amplifier and said second multiplier to said third terminal of said second summing amplifier;
(n) first, second, third and fourth integrators;
(o) connecting means for electrically connecting said first integrator to the output of said first multiplier and the output of said first integrator to the input of said second integrator;
(p) connecting means for electrically connecting said third integrator to the output of said second multiplier and the output of said third integrator to the input of said fourth integrator;
(q) motor means connected to the output of said second integrator for positioning said pen carriage in the direction of the ordinate;
(r) motor means connected to the output of said fourth integrator for positioning said pen carriage in the direction of the abscissa;
(s) means disposed in said first and second multiplier for setting the constants according to the ratio of charge to mass of said charged particle;
(t) means in said first and third integrators whereby the initial velocity of said particle may be set;
(u) means disposed in said second and third integrators whereby the initial orientation of said particle may be set; and
(v) recording means connected to the output of said second and fourth integrator for recording the path of said charged particle.

References Cited by the Examiner

UNITED STATES PATENTS

| | | | |
|---|---|---|---|
| 2,542,478 | 2/1951 | Clark | 235—184 |
| 3,038,656 | 6/1962 | Horwitz et al. | 235—61.6 |

MALCOLM A. MORRISON, *Primary Examiner.*

K. W. DOBYNS, *Assistant Examiner.*